United States Patent [19]

Murray

[11] 4,028,848
[45] June 14, 1977

[54] LAMP PEDESTAL WITH TERRARIUM BOWL

[75] Inventor: David E. Murray, Detroit, Mich.

[73] Assignee: Michael D. Murray, Farmington, Mich. ; a part interest

[22] Filed: May 21, 1976

[21] Appl. No.: 688,845

[52] U.S. Cl. .................................. 47/69; 240/10 P; 240/52.6; D48/20 D

[51] Int. Cl.² .......................................... A01G 9/02

[58] Field of Search ............ D48/20; 47/34.11, 34, 47/39, 41; 220/324, 326; 240/52.6, 10 P; D11/144.5; 119/5

[56] References Cited

UNITED STATES PATENTS

| 884,924 | 4/1908 | Helmschmied | 47/34 |
|---|---|---|---|
| 1,297,254 | 3/1919 | Sato | 119/5 |
| 1,419,152 | 6/1922 | Lansing et al. | 47/34 X |
| 1,762,634 | 6/1930 | Jyumi | 240/52.6 X |
| 2,060,005 | 11/1936 | Fletcher et al. | 47/41 |
| 3,175,853 | 3/1965 | Gilbertson | 220/326 X |

FOREIGN PATENTS OR APPLICATIONS

| 1,076,597 | 10/1954 | France | 47/34 |
|---|---|---|---|
| 854,306 | 11/1960 | United Kingdom | 47/34 |

Primary Examiner—Robert E. Bagwill
Attorney, Agent, or Firm—Cullen, Settle, Sloman & Cantor

[57] ABSTRACT

A lamp having a base, a light assembly and wiring therefor includes a terrarium lower bowl of transparent material forming a part of and projecting from the base and terminating in an annular rim to define an open end. The lower bowl is adapted to hold soil material and growing plants. An upper bowl of transparent material is open at its lower end and formed with an inset annular flange bearing against and extending into the lower bowl annular rim with the upper bowl supported upon and forming a continuation of the lower bowl. An annular bead upon the interior of the lower bowl rim is adapted to receive the corresponding externally grooved portion in said flange for securing the upper and lower bowls together. Another method of fastening the bowls together includes a pair of spaced internal latches which extend through apertures adjacent the lower end of the upper bowl with internal portions of said latches adapted to retainingly engage an annular lock flange upon the interior of the lower bowl rim. A wire enclosing support tube is coaxially mounted within the lower bowl and extends to the open end thereof. A wire enclosing tube extension is coaxially mounted within the upper bowl and extends adjacent the lower end thereof for cooperative interlocking registry with the support tube. The wiring for the lamp includes a first wire in the extension tube terminating in a prong at the lower end thereof, and a second wire within the support tube terminating in the socket upon the end thereof for cooperative engagement with said prong connector.

5 Claims, 4 Drawing Figures

LAMP PEDESTAL WITH TERRARIUM BOWL

BACKGROUND OF THE INVENTION

It is known in the art to provide a lamp having a bowl to receive planting material and plants with access to the interior being through an aperture therein such as disclosed in British patent specification No. 854,306. Other examples in the prior art of efforts to provide for plantings or other ornament upon the interior of a transparent lamp bowl are shown in the following United States Patents:

| U.S. PAT. NO. | INVENTOR |
| --- | --- |
| 1,297,254 | Sato |
| 1,788,058 | Jyumi |
| 2,141,769 | Simpson |
| 2,631,409 | Windiate |
| 2,695,355 | Giusto |
| 3,704,545 | Van Reisen |

SUMMARY OF THE INVENTION

It is an object of the present invention to provide an improved lamp with terrarium bowl and wherein the lamp bowl is constructed of two pieces to form a lower bowl and an upper bowl which may be separated for access to plant material and plants upon the interior of the lower bowl.

It is another object to provide an improved lamp construction which includes as a part of the base a lower bowl having an open end annular rim and with an upper bowl open at its lower end and having an inset flange for projection down into the lower bowl rim and for assembly thereto.

It is another object to provide an improved means for interlockingly connecting the terrarium bowl parts into a unit assembly.

It is a further object to provide an improved telescoping type of electrical connection within the upper and lower bowls which will facilitate assembly and disassembly of the two parts for access to the interior of the terrarium bowl.

These and other objects will be seen from the following specification and Claims in conjunction with the appended drawing.

THE DRAWING

It will be understood that the above drawings illustrates merely a preferred embodiment of the invention, and that other embodiments are contemplated within the scope of the Claims hereafter set forth.

DETAILED DESCRIPTION OF THE INVENTION

Figure 1:
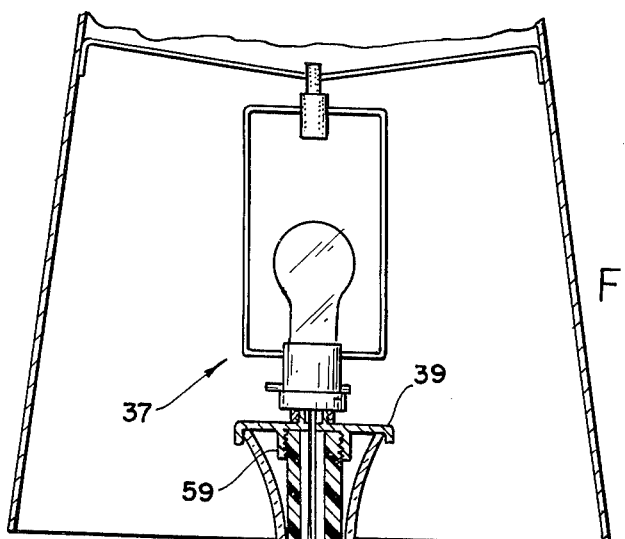
FIG. 1 is a fragmentary vertical section of the present lamp with terrarium bowl assembly.

Referring to the drawing, the Applicant has provided an improved lamp assembly generally indicated at 11 which has a base 13, a bowl, a light assembly 37 and wiring joined to said light assembly and adapted for connection to a power source as in FIG. 1.

The improvement in the present lamp contemplates a modification of the base and a special form of bowl by which the bowl parts are separable and wherein, the bowl is in the form of a terrarium.

The present base 13 includes as a part therof a terrarium lower bowl 15 of transparent material, either glass or plastic such as an acrylic plastic which terminates in an annular rim 17 defining an open end. Said lower bowl is adapted to hold a soil material 19 such as dirt, sand or vermiculite in which plants 21 can grow such as cactus or the like. An annular lock flange 23 is formed upon the interior of the bowl rim 17 below its open end.

A formed upper bowl 25 of transparent material such as glass or an acrylic plastic, for example, is arranged over the lower bowl 15 and at its lower open end has an annular inset flange 27 adapted to nest within the lower bowl rim as shown in FIG. 1. The inset flange 27 defines within said upper bowl the annular exterior shoulder 29 adapted to rest upon said rim and form a smooth continuation thereof.

As one form of further securing together the upper and lower bowls, there is provided adjacent the lower end of said upper bowl transverse apertures 31 adapted to receive the free ends of the internal latches 33. Said latches have latch arms at their lower ends adapted to retainingly engage lock flange 23 within the lower bowl.

While there is shown a telescoping assembly of the lower end of the upper bowl within the lower bowl rim, the pair of oppositely arranged internal latches provide a further means of anchoring the bowl parts in coaxial assembled relationship. It appears as shown by the arrows in FIG. 1 that a downward pressure on the exterior portions of the latches at their upper ends will cause an inward swinging movement of the latch arms 25 so as to disengage from lock flange 23.

The aforementioned light assembly generally indicated at 37 rests upon the top cap 39 at the upper end of said upper bowl for closing it off and for providing a conventional type of support mounting for the bulb socket 75 and a bulb 77 which forms the light assembly.

An upright base support tube 41 is anchored at 43 within the lamp base 13 and extends up to and adjacent the open end or rim of lower bowl 15. The upper end of the support tube has an open end flange 45 with an internal bore 47 defining a shoulder as well as a counterbore 49 to receive and support socket 51 connected to the wires 53 which extend through said support tube and terminate in a conventional plug 55.

Figure 4:
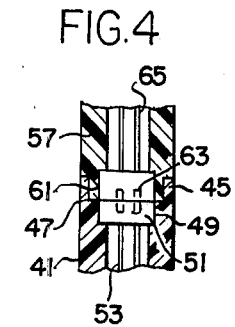
FIG. 4 is a fragmentary view similar to FIG. 1 showing on an enlarged scale the connection between the wire enclosing bowl support tube and wire enclosing extension tube.

Axially within the upper bowl there is provided an upright tube extension 57 which is anchored at 59 at its upper end with respect to the cap 39 and has a lower open end adjacent the open end of the upper bowl and terminates in the annular depending assembly flange 61, shown in FIG. 4. A suitable prong connector 63 is nested within a corresponding counterbore within the lower end of said tube extension adjacent the assembly flange 61 and is connected to the lower ends of the additional wires 65 which extend from the prong connector up to the light assembly and secured thereto in a conventional manner.

Accordingly, while the conventional lamp may have wiring joined to the light assembly 37 adapted for connection to a power source as at 55, in the present improved assembly, wherein the upper bowl is removable from the lower bowl, the enclosure for the wires includes the pair of aligned members, i.e., base support tube 41 and the extension tube 57. These are telescopically assembled at their meeting edges at the same time as the upper bowl 25 is brought into telescoping assembly with the lower bowl rim. In FIG. 4 the depending flange 61 telescopes down into the corresponding recess 47 at the upper end of the support tube.

At the same time that this assembly is completed, the conventional prongs of the prong connector 63 assemble within corresponding apertures in the upper end of the conventional electrical socket 51.

Figure 3:
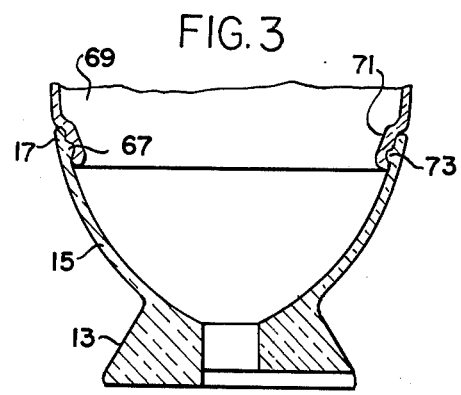
FIG. 3 is a fragmentary view similar to FIG. 1 showing a different method of interconnecting the terrarium bowl parts.
Figure 2:
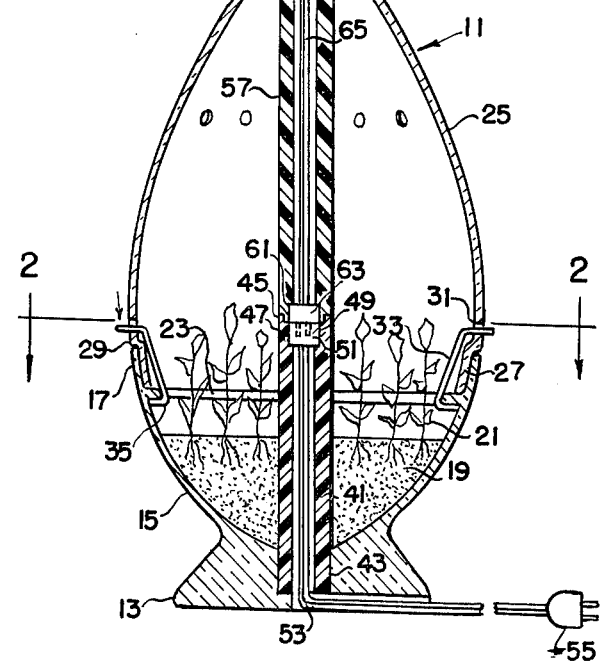
FIG. 2 is a section taken in the direction of arrows 2—2 of FIG. 1.

A modified locking assembly is shown in FIG. 3 wherein, there is provided an internal annular bead 67 within the rim 17 of the lower bowl 15, similar to the lock flange 23 of FIG. 1. The lower end of the upper bowl has a corresponding inset flexible flange 71 with an exterior recess 73 adapted to engage the bead with a snap assembly action.

It is contemplated that other forms of interlocking connection could be provided between terrarium bowl parts.

Having described my invention, reference should now be had to the following Claims.

I claim:

1. In a lamp including a base, a bowl, a bulb socket, and wiring joined to said socket and adapted for connection to a power source; the improvement comprising:
    a terrarium lower bowl of transparent material forming a part of and projecting from said base terminating in an annular rim defining an open end;
    said bowl adapted to hold soil material and growing plants;
    an upper bowl of transparent material open at its lower end and formed with an inset annular flange bearing against and extending into said lower bowl annular rim with said upper bowl supported upon and forming a continuation of said lower bowl;
    said wiring extending through said upper and lower bowls and exiting from said base;
    an annular bead upon the interior of said lower bowl rim below its open end;
    said base flange being formed with an external groove retainingly receiving said bead.

2. In a lamp including a base, a bowl, a bulb socket on the top of said bowl and wiring joined to said socket and adapted for connection to a power source; the improvement comprising:
    a terrarium lower bowl of transparent material forming a part of and projecting from said base terminating in an annular rim defining an open end;
    said bowl adapted to hold soil material and growing plants; an upper bowl of transparent material open at its lower end and formed with an inset annular flange bearing against and extending into said lower bowl annular rim, supported upon and forming a continuation of said lower bowl;
    said wiring extending through said upper and lower bowls and exiting from said base;
    fastening means releasably securing said bowls together;
    said fastening means including a pair of releasable latches upon the interior of said upper bowl extending through apertures adjacent the lower end thereof; and
    an annular lock flange upon the interior of said lower bowl rim; portions of said latches retainingly engaging said lock flange.

3. In a lamp including a base, a bowl, a bulb socket on the top of said bowl and wiring joined to said socket and adapted for connection to a power source; the improvement comprising:
    a terrarium lower bowl of transparent material forming a part of and projecting from said base terminating in an annular rim defining an open end;
    said bowl adapted to hold soil material and growing plants;
    an upper bowl of transparent material open at its lower end and formed within an inset annular flange bearing against and extending into said lower bowl annular rim, supported upon and forming a continuation of said lower bowl;
    said wiring extending through said upper and lower bowls and exiting from said base;
    a support tube mounted upon said base and extending axially thereof to adjacent the open end of said lower bowl;
    an apertured cap mounted on the top of said upper bowl;
    a tube extension within said upper bowl at its upper end secured to said cap and coaxial therewith; with its lower end extending to adjacent the lower open end of said upper bowl for cooperative interlocking registry with said support tube; and
    said wiring extending through said support tube and tube extension.

4. In the lamp of claim 3 said interlocking registry between said support tube and tube extension including one thereof having an insert assembly flange telescopically nested within a corresponding recess in the other thereof.

5. In the lamp of claim 4, said wiring including a first wire in said extension tube terminating in a prong connector at the lower end of said extension tube; and a second wire in said support tube terminating in a socket at the upper end of said support tube for cooperative connecting registry with said prong connector.

* * * * *